(12) United States Patent
Kang et al.

(10) Patent No.: US 11,515,934 B2
(45) Date of Patent: Nov. 29, 2022

(54) METHOD AND DEVICE FOR DETERMINING SENDING PARAMETERS OF TERMINAL

(71) Applicant: DATANG MOBILE COMMUNICATIONS EQUIPMENT CO., LTD., Beijing (CN)

(72) Inventors: Shaoli Kang, Beijing (CN); Yingmin Wang, Beijing (CN); Shaohui Sun, Beijing (CN); Deshan Miao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/617,572

(22) PCT Filed: Mar. 23, 2020

(86) PCT No.: PCT/CN2020/080708
§ 371 (c)(1),
(2) Date: Dec. 8, 2021

(87) PCT Pub. No.: WO2020/248645
PCT Pub. Date: Dec. 17, 2020

(65) Prior Publication Data
US 2022/0209854 A1    Jun. 30, 2022

(30) Foreign Application Priority Data

Jun. 13, 2019    (CN) .......................... 201910510201.9

(51) Int. Cl.
*H04B 7/185*    (2006.01)
*H04W 52/46*    (2009.01)

(52) U.S. Cl.
CPC ...... *H04B 7/18513* (2013.01); *H04B 7/18519* (2013.01); *H04B 7/18543* (2013.01); *H04W 52/46* (2013.01)

(58) Field of Classification Search
CPC ............ H04B 7/18513; H04B 7/18519; H04B 7/18543; H04B 10/564; H04W 52/46
See application file for complete search history.

(56) References Cited

U.S. PATENT DOCUMENTS 7,437,125 B2 * 10/2008 McLain ............. H04B 7/18506
                                                        455/427
8,077,629 B2 * 12/2011 Miller ................... H04B 17/40
                                                        370/252
(Continued)

FOREIGN PATENT DOCUMENTS

CN         1535904 A    10/2004
CN       101141184 A     3/2008
(Continued)

OTHER PUBLICATIONS

CATT, "Self-evaluation on User Experienced Data Rate in Dense Urban-eMBB for LTE and NR", 3GPP TSG RAN WG1 Meeting #96bis, Xi'an, China, Apr. 8-12, 2019, total 4 pages, R1-1904556.
(Continued)

*Primary Examiner* — Alpus Hsu
(74) *Attorney, Agent, or Firm* — Kilpatrick Townsend & Stockton, LLP

(57) ABSTRACT

A method and a device for determining sending parameters of a terminal are disclosed. The method includes: determining a pre-estimated signal-to-noise ratio of an uplink on at least one reference position in a cell range corresponding to a satellite beam, determining, according to the pre-estimated signal-to-noise ratio of the uplink, effective isotropic radiated power (EIRP) values corresponding to a preset carrier bandwidth of the uplink, determining, according to the EIRP
(Continued)

values corresponding to the preset carrier bandwidth of the uplink, a maximum rate supported by the preset carrier bandwidth of the uplink, determining, according to the maximum rate supported by the preset carrier bandwidth of the uplink, a maximum uplink rate supported by the terminal, and determining an uplink sending maximum EIRP value and/or an uplink sending maximum bandwidth of the terminal according to an uplink rate to be supported by the terminal input by a user.

17 Claims, 5 Drawing Sheets

(56) References Cited

U.S. PATENT DOCUMENTS

| | | | | |
|---|---|---|---|---|
| 9,154,392 | B2* | 10/2015 | Norair | H04L 1/0083 |
| 9,253,727 | B1* | 2/2016 | Luna, Jr. | H04W 52/20 |
| 9,661,592 | B2* | 5/2017 | Seol | H04W 52/24 |
| 2002/0058477 | A1* | 5/2002 | Chapelle | H04W 52/283 |
| | | | | 455/431 |
| 2003/0013409 | A1* | 1/2003 | Buckshaw | H04B 7/18513 |
| | | | | 455/12.1 |
| 2006/0040614 | A1* | 2/2006 | Chapelle | H04B 7/18506 |
| | | | | 455/501 |
| 2007/0026795 | A1* | 2/2007 | de La Chapelle | H04W 52/283 |
| | | | | 455/13.4 |
| 2011/0009055 | A1* | 1/2011 | Miller | H04B 7/18513 |
| | | | | 455/13.4 |
| 2016/0285611 | A1 | 9/2016 | Fischer et al. | |
| 2019/0007129 | A1* | 1/2019 | Vargas | H04B 7/1858 |
| 2019/0120969 | A1* | 4/2019 | Hamzeh | H04J 11/0073 |
| 2019/0280763 | A1* | 9/2019 | Smyth | H04B 7/18517 |
| 2019/0349863 | A1* | 11/2019 | Lim | H04W 52/42 |
| 2020/0037254 | A1* | 1/2020 | Comsa | H04W 52/281 |
| 2020/0413350 | A1* | 12/2020 | Yang | H04W 52/36 |
| 2021/0022083 | A1* | 1/2021 | Takahashi | H04W 8/24 |
| 2021/0345254 | A1* | 11/2021 | Zhou | H04W 52/367 |

FOREIGN PATENT DOCUMENTS

| | | |
|---|---|---|
| CN | 105207711 A | 12/2015 |
| CN | 106656301 A | 5/2017 |
| CN | 109803363 A | 5/2019 |
| WO | 2009097324 A2 | 8/2009 |

OTHER PUBLICATIONS

CATT,"Considerations on UL full Tx power", 3GPP TSG RAN WG1 #96bis, Xi'an, China, Apr. 8-12, 2019, total 6 pages, R1-1904563.

Rohde & Schwarz,"Testability of NR UE OFF power and minimum output power requirements for mmWave: further aspects", 3GPP TSG RAN WG4 NR#3, Sep. 18-21, 2017, Nagoya, Japan, total 3 pages, R4-1709858.

Samsung,"Ad-Hoc Meeting Minutes for Beam Correspondence", 3GPP TSG-RAN WG4 Meeting #90, Athens, Greece, Feb. 25-Mar. 1, 2019, total 15 pages, R4-1902252.

* cited by examiner

METHOD AND DEVICE FOR DETERMINING SENDING PARAMETERS OF TERMINAL

CROSS REFERENCE TO RELATED APPLICATIONS

The present application is a national phase entry under 35 U.S.C. § 371 of International Application No. PCT/CN2020/080708, filed on Mar. 23, 2020, which claims priority to Chinese patent application No. 201910510201.9 filed on Jun. 13, 2019 to the China National Intellectual Property Administration, and entitled "METHOD AND APPARATUS FOR DETERMINING SENDING PARAMETERS OF TERMINAL", the entire content of which is incorporated herein by reference.

FIELD

The present application relates to the field of satellite communication, in particular to a method and apparatus for determining sending parameters of a terminal.

BACKGROUND

For a satellite mobile communication system, due to the limitation of transceiving abilities of satellites and terminals, power and bandwidths are both limited resources, and thus the satellite mobile communication system needs to reasonably allocate power and bandwidth resources to the terminals according to the transceiving abilities of the terminals.

In the related art, transceiving abilities of satellites and receiving abilities of terminals can be determined through existing methods, but there is no reasonable solution for determining sending abilities of the terminals at present.

SUMMARY

The present application provides a method and apparatus for determining sending parameters of a terminal, used to determine the sending ability of the terminal.

In some embodiments of the present application provide a method for determining sending parameters of a terminal, including:

determining a pre-estimated signal-to-noise ratio of an uplink on at least one reference position in a cell range corresponding to a satellite beam;

determining effective isotropic radiated power (EIRP) values corresponding to a preset carrier bandwidth of the uplink on the at least one reference position according to the pre-estimated signal-to-noise ratio of the uplink on the at least one reference position;

determining a maximum rate supported by the preset carrier bandwidth of the uplink according to the EIRPs value corresponding to the preset carrier bandwidth of the uplink on the at least one reference position;

determining a maximum uplink rate supported by the terminal according to the maximum rate supported by the preset carrier bandwidth of the uplink and a preset maximum supported quantity of concurrency users; and determining an uplink sending maximum EIRP value and/or an uplink sending maximum bandwidth of the terminal according to an uplink rate to be supported by the terminal input by a user, and the uplink rate to be supported by the terminal is not greater than the maximum uplink rate supported by the terminal.

In one embodiment, the determining the pre-estimated signal-to-noise ratio of the uplink on the at least one reference position in the cell range corresponding to the satellite beam, includes:

determining a signal-to-noise ratio of a downlink on the at least one reference position according to transmit power of a satellite corresponding to the at least one reference position and a preset quality factor of a terminal receiver, and using the signal-to-noise ratio of the downlink on the at least one reference position as the pre-estimated signal-to-noise ratio of the uplink on the at least one reference position or using a sum of the signal-to-noise ratio of the downlink and a preset adjustment value as the pre-estimated signal-to-noise ratio of the uplink; or using a preset minimum signal-to-noise ratio as the pre-estimated signal-to-noise ratio of the uplink on the at least one reference position.

In one embodiment, the determining the EIRP values corresponding to the preset carrier bandwidth of the uplink on the at least one reference position according to the pre-estimated signal-to-noise ratio of the uplink on the at least one reference position, includes:

determining the EIRP value corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

In one embodiment, the determining the maximum rate supported by the preset carrier bandwidth of the uplink according to the EIRP values corresponding to the preset carrier bandwidth of the uplink on the at least one reference position, includes:

using a maximum value in the EIRP values corresponding to the preset carrier bandwidth of the uplink as an uplink sending EIRP value corresponding to each of the at least one reference position;

determining an uplink rate on the at least one reference position according to the uplink sending EIRP value and the preset carrier bandwidth of the uplink; and determining the maximum rate supported by the preset carrier bandwidth of the uplink according to the uplink rate on the at least one reference position.

In one embodiment, the determining the uplink rate on the at least one reference position according to the uplink sending EIRP value and the preset carrier bandwidth of the uplink, includes:

determining an actual signal-to-noise ratio of the uplink on the at least one reference position according to the uplink sending EIRP value, a link loss, a preset quality factor of a satellite receiver and noise power of the satellite receiver;

determining spectral efficiency on the at least one reference position according to the actual signal-to-noise ratio of the uplink on the at least one reference position; and determining the uplink rate on the at least one reference position according to the spectral efficiency on the at least one reference position and the preset carrier bandwidth of the uplink.

In one embodiment, the determining the maximum rate supported by the preset carrier bandwidth of the uplink according to the uplink rate on the at least one reference position, includes:

using a mean value of the uplink rate on the at least one reference position as the maximum rate supported by the preset carrier bandwidth of the uplink.

In one embodiment, the determining the maximum uplink rate supported by the terminal according to the maximum rate supported by the preset carrier bandwidth of the uplink and the preset maximum supported quantity of the concurrency users, includes:

using a ratio of the maximum rate supported by the preset carrier bandwidth of the uplink to the preset maximum supported quantity of the concurrency users as the maximum uplink rate supported by the terminal.

In one embodiment, the determining the uplink sending maximum EIRP value and/or the uplink sending maximum bandwidth of the terminal according to the uplink rate to be supported by the terminal input by the user, the uplink rate to be supported by the terminal is not greater than the maximum uplink rate supported by the terminal, includes:

receiving the uplink rate to be supported by the terminal input by the user;

determining whether the uplink rate to be supported by the terminal is greater than the maximum uplink rate supported by the terminal; and determining the uplink sending maximum EIRP value and/or the uplink sending maximum bandwidth of the terminal according to the uplink rate to be supported by the terminal, if the uplink rate to be supported by the terminal is not greater that the maximum uplink rate supported by the terminal.

In some embodiments of the present application provide an apparatus for determining sending parameters of a terminal, including: a processor and a memory;

the processor is configured to read a computer instruction in the memory and execute:

determining a pre-estimated signal-to-noise ratio of an uplink on at least one reference position in a cell range corresponding to a satellite beam;

determining effective isotropic radiated power (EIRP) values corresponding to a preset carrier bandwidth of the uplink on the at least one reference position according to the pre-estimated signal-to-noise ratio of the uplink on the at least one reference position;

determining a maximum rate supported by the preset carrier bandwidth of the uplink according to the EIRP values corresponding to the preset carrier bandwidth of the uplink on the at least one reference position;

determining a maximum uplink rate supported by the terminal according to the maximum rate supported by the preset carrier bandwidth of the uplink and a preset maximum supported quantity of concurrency users; and determining an uplink sending maximum EIRP value and/or an uplink sending maximum bandwidth of the terminal according to an uplink rate to be supported by the terminal input by a user, and the uplink rate to be supported by the terminal is not greater than the maximum uplink rate supported by the terminal and is to be supported by the terminal.

In one embodiment, the processor is configured to execute:

determining a signal-to-noise ratio of a downlink on the at least one reference position according to transmit power of a satellite corresponding to the at least one reference position and a preset quality factor of a terminal receiver, and using the signal-to-noise ratio of the downlink on the at least one reference position as the pre-estimated signal-to-noise ratio of the uplink on the at least one reference position or using a sum of the signal-to-noise ratio of the downlink and a preset adjustment value as the pre-estimated signal-to-noise ratio of the uplink; or using a preset minimum signal-to-noise ratio as the pre-estimated signal-to-noise ratio of the uplink on the at least one reference position.

In one embodiment, the processor is configured to execute:

determining the EIRP values corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

In one embodiment, the processor is configured to execute:

using a maximum value in the obtained EIRP values corresponding to the preset carrier bandwidth of the uplink as an uplink sending EIRP value corresponding to each of the at least one reference position;

determining an uplink rate on the at least one reference position according to the uplink sending EIRP value and the preset carrier bandwidth of the uplink; and determining the maximum rate supported by the preset carrier bandwidth of the uplink according to the uplink rate on the at least one reference position.

In one embodiment, the processor is configured to execute:

determining an actual signal-to-noise ratio of the uplink on the at least one reference position according to the uplink sending EIRP value, a link loss, a preset quality factor of a satellite receiver and noise power of the satellite receiver;

determining spectral efficiency on the at least one reference position according to the actual signal-to-noise ratio of the uplink on the at least one reference position; and determining the uplink rate on the at least one reference position according to the spectral efficiency on the at least one reference position and the preset carrier bandwidth of the uplink.

In one embodiment, the processor is configured to execute:

using a mean value of the uplink rate on the at least one reference position as the maximum rate supported by the preset carrier bandwidth of the uplink.

In one embodiment, the processor is configured to execute:

using a ratio of the maximum rate supported by the preset carrier bandwidth of the uplink to the preset maximum supported quantity of the concurrency users as the maximum uplink rate supported by the terminal.

In one embodiment, the processor is configured to execute:

receiving the uplink rate to be supported by the terminal input by the user;

determining whether the uplink rate to be supported by the terminal is greater than the maximum uplink rate supported by the terminal; and determining the uplink sending maximum EIRP value and/or the uplink sending maximum bandwidth of the terminal according to the uplink rate to be supported by the terminal, if the uplink rate to be supported by the terminal is not greater than the maximum uplink rate supported by the terminal.

In some embodiments of the present application provide an apparatus for determining sending parameters of a terminal, including:

a signal-to-noise ratio determining device, configured to determine a pre-estimated signal-to-noise ratio of an uplink on at least one reference position in a cell range corresponding to a satellite beam;

an EIRP value determining device, configured to determine EIRP values corresponding to a preset carrier bandwidth of the uplink on the at least one reference position according to the pre-estimated signal-to-noise ratio of the uplink on the at least one reference position;

a link supporting rate determining device, configured to determine a maximum rate supported by the preset carrier bandwidth of the uplink according to the EIRP values corresponding to the preset carrier bandwidth of the uplink on the at least one reference position;

a terminal supporting rate determining device, configured to determine a maximum uplink rate supported by the terminal according to the maximum rate supported by the preset carrier bandwidth of the uplink and a preset maximum supported quantity of concurrency users; and a terminal sending parameter determining device, configured to determine an uplink sending maximum EIRP value and/or an uplink sending maximum bandwidth of the terminal according to an uplink rate to be supported by the terminal input by a user, and the uplink rate to be supported by the terminal is not greater than the maximum uplink rate supported by the terminal.

In one embodiment, the signal-to-noise ratio determining device is further configured to:

determine a signal-to-noise ratio of a downlink on the at least one reference position according to transmit power of a satellite corresponding to the at least one reference position and a preset quality factor of a terminal receiver, and use the signal-to-noise ratio of the downlink on the at least one reference position as the pre-estimated signal-to-noise ratio of the uplink on the at least one reference position or using a sum of the signal-to-noise ratio of the downlink and a preset adjustment value as the pre-estimated signal-to-noise ratio of the uplink; or use a preset minimum signal-to-noise ratio as the pre-estimated signal-to-noise ratio of the uplink on the at least one reference position.

In one embodiment, the EIRP value determining device is further configured to:

determine the EIRP values corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

In one embodiment, the link supporting rate determining device is further configured to:

use a maximum value in the obtained EIRP values corresponding to the preset carrier bandwidth of the uplink as an uplink sending EIRP value corresponding to each of the at least one reference position;

determine an uplink rate on the at least one reference position according to the uplink sending EIRP value and the preset carrier bandwidth of the uplink; and determine the maximum rate supported by the preset carrier bandwidth of the uplink according to the uplink rate on the at least one reference position.

In one embodiment, the link supporting rate determining device is further configured to:

determine an actual signal-to-noise ratio of the uplink on the at least one reference position according to the uplink sending EIRP value, a link loss, a preset quality factor of a satellite receiver and noise power of the satellite receiver;

determine spectral efficiency on the at least one reference position according to the actual signal-to-noise ratio of the uplink on the at least one reference position; and determine the uplink rate on the at least one reference position according to the spectral efficiency on the at least one reference position and the preset carrier bandwidth of the uplink.

In one embodiment, the link supporting rate determining device is further configured to:

use a mean value of the uplink rate on the at least one reference position as the maximum rate supported by the preset carrier bandwidth of the uplink.

In one embodiment, the terminal supporting rate determining device is further configured to:

use a ratio of the maximum rate supported by the preset carrier bandwidth of the uplink to the preset maximum supported quantity of the concurrency users as the maximum uplink rate supported by the terminal.

In one embodiment, the terminal sending parameter determining device is further configured to:

receive the uplink rate to be supported by the terminal input by the user;

determine whether the uplink rate to be supported by the terminal is greater than the maximum uplink rate supported by the terminal; and determine the uplink sending maximum EIRP value and/or the uplink sending maximum bandwidth of the terminal according to the uplink rate to be supported by the terminal, if the uplink rate to be supported by the terminal is not greater than the maximum uplink rate supported by the terminal.

In some embodiments of the present application provide a computer readable storage medium, storing a computer program thereon, steps of any method for determining the sending parameters of the terminal in the embodiments above are implemented when the computer program is executed by a processor.

BRIEF DESCRIPTION OF THE DRAWINGS

In order to illustrate the embodiments of the present application more clearly, the following will briefly introduce the drawings that need to be used in the description of the embodiments. Apparently, the drawings in the following description are only some embodiments of the present application.

DETAILED DESCRIPTION OF THE EMBODIMENTS

Parts of terms in embodiments of the present application are explained below.

(1) Low earth orbit satellite system (LEO): an LEO satellite mobile communication system refers to a large satellite communication system composed of satellites and to process information in real time, the orbit height of satellites of the system is low, and thus the system has the characteristics of short transmission delay and small path loss.

(2) Effective isotropic radiated power (EIRP): radiated power of a transmitting antenna of a satellite or a terminal in the center axial direction of a beam, equal to a product of power of a supply antenna of a radio transmitter and an antenna gain in a given direction, and also called equivalent isotropically radiated power. This parameter is used to represent a signal transmitting ability of the satellite or the terminal.

(3) Link loss: including a path loss and other losses. The pass loss refers to a loss generated by propagating of a satellite beam in space, is caused by radiated diffusion of transmit power and a propagating characteristic of a channel, and reflects change in power mean value of received signals within a macro range.

(4) Gain/temperature (G/T): a quality factor of a receiving end, and an index in a satellite mobile communication system. G represents an antenna gain of a receiver, and T represents an equivalent noise temperature of noise performance of the receiver. Generally speaking, a G/T value will gradually decrease along with aging of devices in the using process of equipment.

(5) Signal-to-noise ratio (SNR): a ratio of a signal to noise in an uplink or a downlink of a satellite mobile communication system.

(6) "And/or" describes the association relationship of associated objects, which means that there can be three kinds of relationships, for example, A and/or B can mean that there are three kinds of situations: A alone, A and B at the same time, and B alone. The character "/" generally indicates that associated objects are in an "or" relationship.

(7) The term "a plurality of" in the embodiments of the present application means two or more, and other quantifiers are similar to it.

Figure 1:
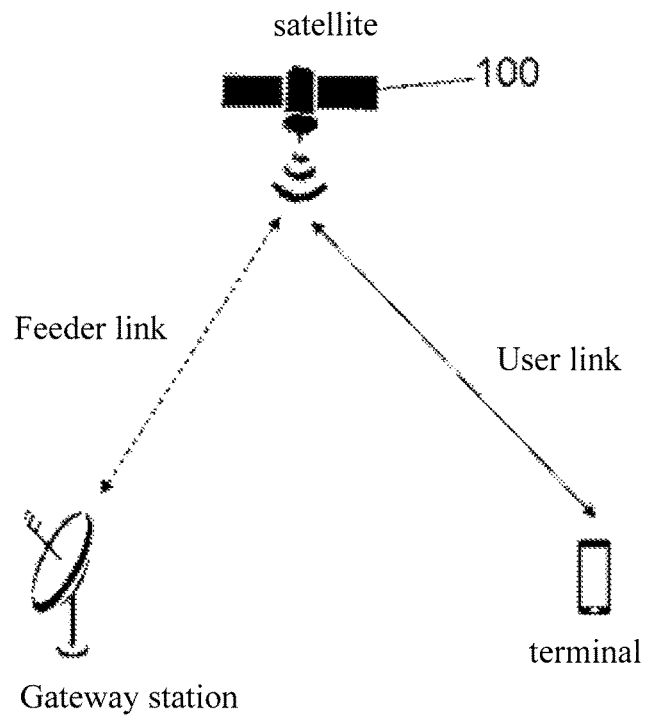
FIG. 1 is an application scenario diagram of a method for determining sending parameters of a terminal provided by an embodiment of the present application.

A method for determining sending parameters of a terminal of the embodiments of the present application is applied to a satellite mobile communication system. FIG. 1 shows a system architecture diagram of a satellite mobile communication system to which the embodiments of the present application is applicable. Generally speaking, the satellite mobile communication system includes a satellite, a terminal, a gateway station, a control center and other facilities. In the satellite mobile communication system, as long as the terminal is within a range covered by satellite beams transmitted by the satellite 100, the terminal and the gateway station may communicate by utilizing the satellite 100 as a relay station. A link between the terminal and the satellite is referred to as a user link, and a link between the satellite and the gateway station is referred to as a feeder link. Generally, a complete one-way communication link includes the user link and the feeder link at the same time, and because the feeder link has the better performance than the user link, the user link is mainly considered when link quality is decided.

Figure 2:
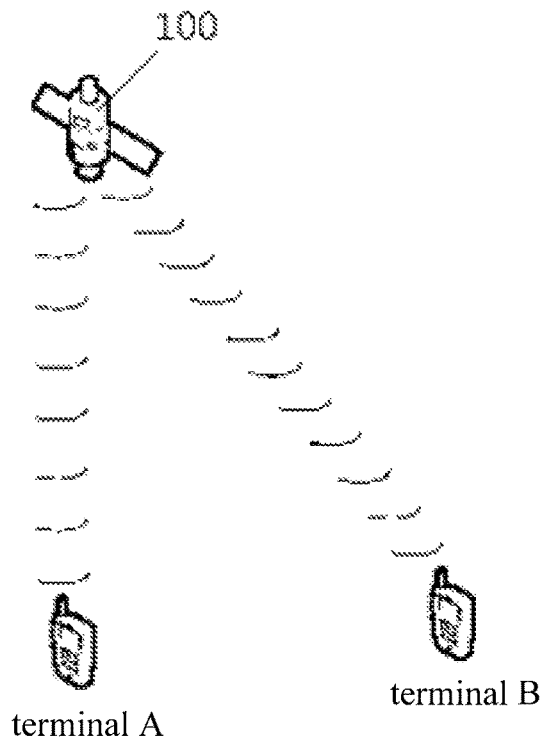
FIG. 2 is another application scenario diagram of a method for determining sending parameters of a terminal provided by an embodiment of the present application.

FIG. 2 shows a system architecture diagram of another satellite mobile communication system to which the embodiments of the present application is applicable. In FIG. 2, the satellite 100 is similar to a base station, and different terminals (such as terminal A and terminal B) can directly communicate through the satellite as long as the terminals are within a range covered by satellite beams transmitted by the satellite 100.

In the embodiments of the present application, the terminal is a device having a wireless communication function, may be deployed on the land, including being deployed indoors or outdoors, and being handheld or vehicle-mounted, may be deployed on water surfaces (e.g., ships), and may be further deployed in the air (e.g., airplanes or balloons). The terminal may have different representation forms, and may be a mobile phone, a pad, a computer with a wireless receiving and sending function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home and the like. The terminal may also be various forms of UE, mobile stations (MS) and such terminal devices. The terminal is configured to enable terminal users to set and obtain communication states through mounted wireless transceiving antennas to complete communication.

The system architecture described in the embodiments of the present application are to more clearly illustrate the embodiments of the present application, and do not constitute a limitation on the embodiments of the present application.

In the satellite mobile communication system, power and bandwidths are both limited resources, and thus the satellite mobile communication system needs to reasonably allocate power and bandwidth resources to the terminal according to the transceiving ability of the terminal. Therefore, the sending ability of the terminal needs to be determined.

Based on this, embodiments of the present application provide a method and apparatus for determining sending parameters of a terminal. A pre-estimated signal-to-noise ratio of an uplink on at least one reference position in a cell range corresponding to a satellite beam is determined first, EIRP values corresponding to a preset carrier bandwidth of the uplink on the at least one reference position is determined according to the pre-estimated signal-to-noise ratio of the uplink on the at least one reference position, a maximum rate supported by the preset carrier bandwidth of the uplink is determined according to the EIRP values corresponding to the preset carrier bandwidth of the uplink on the at least one reference position, a maximum uplink rate supported by the terminal is determined according to the maximum rate supported by the preset carrier bandwidth of the uplink, an uplink rate to be supported by the terminal not greater than the maximum uplink rate supported by the terminal is determined, and uplink sending parameters of the terminal are determined according to the uplink rate to be supported by the terminal. The method can quickly and reasonably determine the uplink sending parameters of the terminal, and a control device in a satellite mobile communication system allocates relevant resources to the terminal according to the obtained uplink sending parameters of the terminal, to guarantee reasonable use of system resources.

Figure 3:
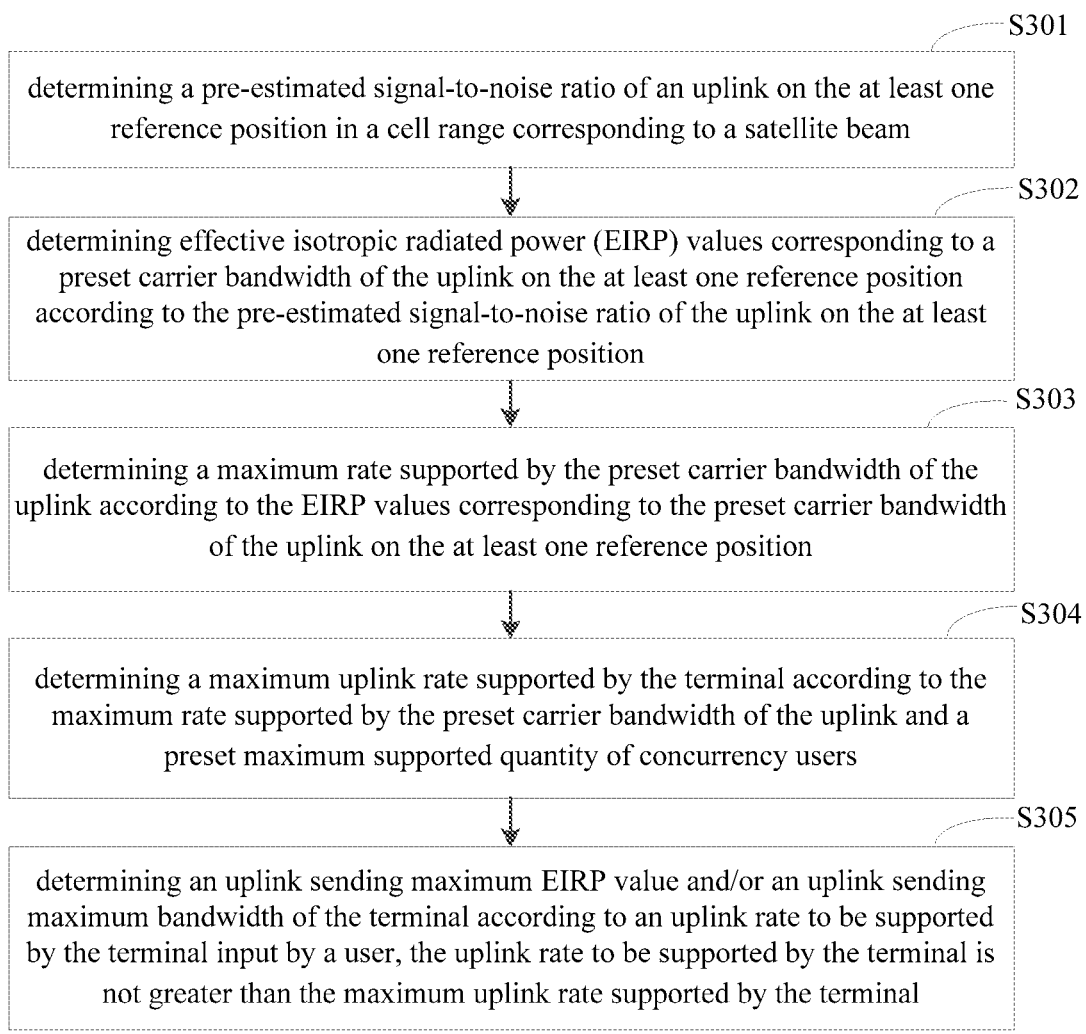
FIG. 3 is a flow diagram of a method for determining sending parameters of a terminal provided by an embodiment of the present application.

The method for determining the sending parameters of the terminal provided by the embodiments of the present application is introduced below first. The method may be applied to a satellite or a control device in the satellite mobile communication system, such as a control device of a ground station, a base station or a control center. FIG. 3 shows a flow diagram of the method for determining the sending parameters of the terminal provided by the embodiment of the present application. As shown in FIG. 3, the method includes the following steps:

S301, determining a pre-estimated signal-to-noise ratio of an uplink on the at least one reference position in a cell range corresponding to a satellite beam;

S302, determining effective isotropic radiated power (EIRP) values corresponding to a preset carrier bandwidth of the uplink on the at least one reference position according to the pre-estimated signal-to-noise ratio of the uplink on the at least one reference position;

S303, determining a maximum rate supported by the preset carrier bandwidth of the uplink according to the EIRP values corresponding to the preset carrier bandwidth of the uplink on the at least one reference position;

S304, determining a maximum uplink rate supported by the terminal according to the maximum rate supported by the preset carrier bandwidth of the uplink and a preset maximum supported quantity of concurrency users; and S305, determining an uplink sending maximum EIRP value and/or an uplink sending maximum bandwidth of the terminal according to an uplink rate to be supported by the terminal input by a user, the uplink rate to be supported by the terminal is not greater than the maximum uplink rate supported by the terminal.

In some embodiments, the uplink sending maximum EIRP value of the terminal may be determined only according to the uplink rate to be supported by the terminal. In other embodiments, the uplink sending maximum bandwidth of the terminal may be determined only according to the uplink rate to be supported by the terminal. In other embodiments, the uplink sending maximum EIRP value and the uplink sending maximum bandwidth of the terminal may be determined according to the uplink rate to be supported by the terminal.

The above method for determining the sending parameters of the terminal can quickly and reasonably determine the uplink sending parameters of the terminal, and the control device in the satellite mobile communication system allocates relevant resources to the terminal according to the uplink sending parameters of the terminal obtained through the above method, to guarantee reasonable use of system resources.

In the satellite mobile communication system, to determine the sending ability of the terminal, the signal-to-noise ratio and the spectral efficiency of the uplink need to be determined first, the maximum rate being supported by the uplink is determined, the maximum uplink rate being supported by the terminal is determined according to the maximum rate being supported by the uplink, and the sending parameters of the terminal are obtained according to the uplink rate to be supported by the terminal input by the user, the uplink rate supported by the terminal is not greater than the maximum uplink rate supported by the terminal, and the sending parameters of the terminal indicate the sending ability of the terminal.

Since the EIRP values of the terminal cannot be determined, a signal-to-noise ratio of the uplink cannot be directly determined according to the EIRP values of the terminal and the quality factor of the satellite receiver. To solve the problem, in the embodiments of the present application, the pre-estimated signal-to-noise ratio of the uplink on the at least one reference position in the cell range corresponding to the satellite beam is determined first. The pre-estimated signal-to-noise ratio of the uplink on the reference position may be determined according to a signal-to-noise ratio of a downlink on a reference position or a preset minimum signal-to-noise ratio.

Figure 4:
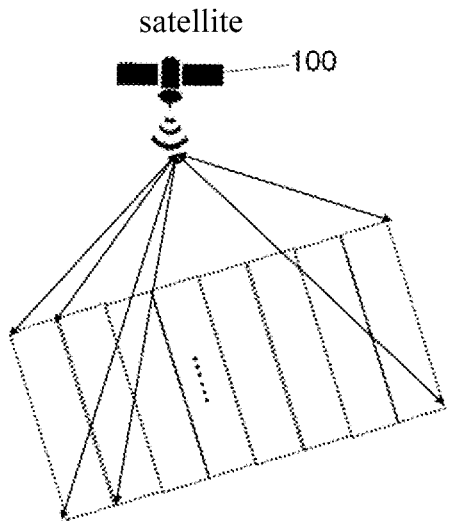
FIG. 4 is a schematic diagram of one satellite supporting satellite beams provided by an embodiment of the present application.
Figure 5:
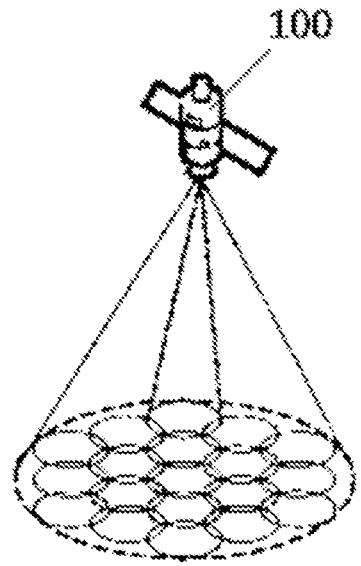
FIG. 5 is a schematic diagram of another satellite supporting satellite beams provided by an embodiment of the present application.

As shown in FIG. 4 or FIG. 5, the satellite 100 may support satellite beams, each of the satellite beams corresponds to a covering region (a rectangular region in FIG. 4 and a circular region in FIG. 5) on the ground, and each covering region may be referred to as the cell range corresponding to the satellite beam. One or more reference positions may be preset within the cell range corresponding to the satellite beam to be used for pre-calculation of an uplink to determine the maximum rate being supported by the uplink. By presetting the reference positions within the cell range corresponding to the satellite beam, uplink-related parameters corresponding to the reference positions may be integrated, to improve reliability of results obtained by calculation.

Accordingly, in S301, the pre-estimated signal-to-noise ratio of the uplink on the at least one reference position in the cell range corresponding to the satellite beam may be determined through one of following manners.

First manner: a signal-to-noise ratio of a downlink on the at least one reference position is determined according to transmit power of a satellite corresponding to the at least one reference position and a preset quality factor of a terminal receiver, and the signal-to-noise ratio of the downlink on the at least one reference position is used as the pre-estimated signal-to-noise ratio of the uplink on the at least one reference position.

For any reference position, under the condition that the transmit power of the satellite and the preset quality factor of the terminal receiver are known, the signal-to-noise ratio of the downlink on the reference position may be determined through a following formula.

$$SNR_{DL,m} = EIRP_{DL,m} + [G/T]_{DL} - P_{Dn} - L_{0,m} - L_{1,m};$$
$$m = 1 \ldots M;$$

where $SNR_{DL,m}$ represents a signal-to-noise ratio of a downlink on the $m^{th}$ reference position, $EIRP_{DL,m}$ represents equivalent transmit power of the satellite corresponding to the $m^{th}$ reference position, $[G/T]_{DL}$ represents the quality factor of the terminal receiver, $P_{Dn}$ represents noise power of the terminal receiver, $L_{0,m}$ represents a path loss on the $m^{th}$ reference position, and $L_{1,m}$ represents a sum of other losses other than the path loss on the $m^{th}$ reference position. Said other losses may include a frequency reuse loss, a nonlinear loss, a power back-off loss, a polarization loss, an antenna pointing loss, an antenna scanning loss, atmosphere absorption, noise of feeder link needing to be considered, consideration of redundancy of link stability influences, rain/cloud attenuation and the like. $L_{0,m} + L_{1,m}$ represents the link loss on the $m^{th}$ reference position, that is, the link loss includes a sum of the path loss and the other losses. $L_{0,m}$ and $L_{1,m}$ may be obtained through measurement and calculation, and a calculation formula is introduced as follows. M represents a total quantity of the preset reference positions.

The signal-to-noise ratio $SNR_{DL,m}$ of the downlink on the $m^{th}$ reference position is obtained by calculation, and may be used as the pre-estimated signal-to-noise ratio of the uplink on the $m^{th}$ reference position.

Second manner: the signal-to-noise ratio of the downlink on the at least one reference position is determined according to the transmit power of the satellite corresponding to the at least one reference position and the preset quality factor of the terminal receiver, and a sum of the signal-to-noise ratio of the downlink and a preset adjustment value is used as the pre-estimated signal-to-noise ratio of the uplink.

In this manner, the signal-to-noise ratio $SNR_{DL,m}$ of the downlink on the $m^{th}$ reference position is obtained by calculation, and the pre-estimated signal-to-noise ratio of the uplink on the $m^{th}$ reference position may be determined through a following formula.

$SNR_{UL',m}=SNR_{DL,m}+\delta$; where $SNR_{UL',m}$ is the pre-estimated signal-to-noise ratio of the uplink on the $m^{th}$ reference position, and $\delta$ is the preset adjustment value. In order to make the uplink reach the performance of the downlink as much as possible, a value range of $\delta$ is suggested to range from $-3$ dB$\leq\delta\leq0$.

Third manner: a preset minimum signal-to-noise ratio is used as the pre-estimated signal-to-noise ratio of the uplink on the at least one reference position.

Considering that the signal-to-noise ratio of the uplink needs to meet a minimum signal-to-noise ratio for working of the satellite mobile communication system, the preset minimum signal-to-noise ratio may be used as the pre-estimated signal-to-noise ratio of the uplink on the at least one reference position, namely $SNR_{UL',m}=SNR_{min}$.

Thus, since the EIRP values of the terminal cannot be determined, a signal-to-noise ratio of the uplink cannot be directly determined according to the EIRP values of the terminal and the quality factor of the satellite receiver. One manner is: the transmit power of the satellite and the preset quality factor of the terminal receiver are both known parameters, the signal-to-noise ratio of the downlink on the at least one reference position may be determined according to the transmit power of the satellite corresponding to the at least one reference position and the preset quality factor of the terminal receiver, and then the pre-estimated signal-to-noise ratio of the uplink is determined according to the signal-to-noise ratio of the downlink. Another manner is: considering that the pre-estimated signal-to-noise ratio of the uplink should meet a minimum signal-to-noise ratio for system working, the preset minimum signal-to-noise ratio may be used as the pre-estimated signal-to-noise ratio of the uplink on the at least one reference position. The pre-estimated signal-to-noise ratio of the uplink may be reasonably determined through the several manners above.

In S302, under the condition that the pre-estimated signal-to-noise ratio of the uplink on the at least one reference position is known, the EIRP values corresponding to the preset carrier bandwidth of the uplink on the at least one reference position may be determined according to a link loss, a preset quality factor of a satellite receiver, noise power of the satellite receiver and the pre-estimated signal-to-noise ratio of the uplink on the at least one reference position.

A calculation formula is as follows:

$EIRP_{UL,m}=-[G/T]_{UL}+P_{Un}+SNR_{UL',m}+L_{0,m}+L_{1,m}$; $m=1\ldots M$;

where $EIRP_{UL,m}$ represents an EIRP value corresponding to the preset carrier bandwidth of the uplink on the $m^{th}$ reference position, $[G/T]_{UL}$ represents the quality factor of the satellite receiver, and $P_{Un}$ represents the noise power of the satellite receiver.

Thus, for any reference position, the EIRPs value corresponding to the preset carrier bandwidth of the uplink on the reference position may be rapidly and accurately determined under the condition that the quality factor of the satellite receiver, the noise power of the satellite receiver, the pre-estimated signal-to-noise ratio of the uplink and the link loss are known.

Figure 6:
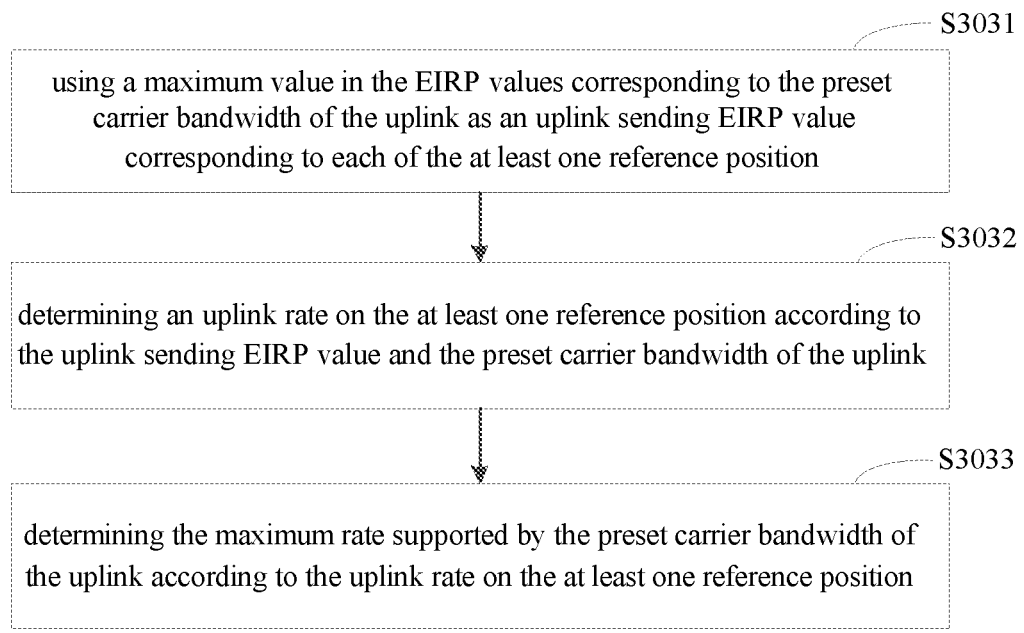
FIG. 6 is a flow diagram of step S303 in FIG. 3.

Above step S303 may be implemented through a method shown in FIG. 6, including the following steps.

S3031, using a maximum value in the EIRP values corresponding to the preset carrier bandwidth of the uplink as an uplink sending EIRP value corresponding to each of the at least one reference position. The step may be represented through a following formula:

$EIRP_{UL}=\max(EIRP_{UL,m}, m=1\ldots M)$;

where $EIRP_{UL}$ represents uplink sending EIRP corresponding to each of M reference positions.

S3032, determining an uplink rate on the at least one reference position according to the uplink sending EIRP value and the preset carrier bandwidth of the uplink.

Accordingly, S3032 may be implemented through a following manner: an actual signal-to-noise ratio of the uplink on the at least one reference position is determined according to the uplink sending EIRP value, the link loss, the preset quality factor of the satellite receiver and the noise power of the satellite receiver; spectral efficiency on the at least one reference position is determined according to the actual signal-to-noise ratio of the uplink on the at least one reference position; and the uplink rate on the at least one reference position is determined according to the spectral efficiency on the at least one reference position and the preset carrier bandwidth of the uplink.

That is, for any reference position, the actual signal-to-noise ratio of the uplink on the at least one reference position is determined according to the uplink sending EIRP value, the link loss, the preset quality factor of the satellite receiver and the noise power of the satellite receiver, and then the spectral efficiency on the at least one reference position is determined, and the uplink rate on the reference position may be accurately obtained according to the spectral efficiency on the at least one reference position and the preset carrier bandwidth of the uplink.

The $EIRP_{UL}$ is used as the uplink sending EIRP value corresponding to the $m^{th}$ reference position, and the actual signal-to-noise ratio of the uplink on the $m^{th}$ reference position may be determined according to a following formula:

$SNR_{UL,m}=EIRP_{UL}+[G/T]_{UL}-P_{Un}-L_{0,m}-L_{1,m}; m=1\ldots M$;

where $SNR_{UL,m}$ represents the actual signal-to-noise ratio of the uplink on the $m^{th}$ reference position.

The spectral efficiency $\eta_m$ on the $m^{th}$ reference position may be determined according to the actual signal-to-noise ratio $SNR_{UL,m}$ of the uplink on the $m^{th}$ reference position and a pre-stored correspondence between signal-to-noise ratios and spectral efficiencies.

Under the condition that the spectral efficiency $\eta_m$ on the $m^{th}$ reference position and the preset carrier bandwidth $BW_{UL}$ of the uplink are known, the uplink rate on the $m^{th}$ reference position may be determined according to a following formula.

$datarate_m=BW_{UL}*\eta_m$;

where $datarate_m$ represents the uplink rate on the $m^{th}$ reference position, $BW_{UL}$ represents the preset carrier bandwidth of the uplink, and $\eta_m$ represents the spectral efficiency on the $m^{th}$ reference position.

S3033, determining the maximum rate supported by the preset carrier bandwidth of the uplink according to the uplink rate on the at least one reference position.

Thus, the maximum value in the EIRP values corresponding to the preset carrier bandwidth of the uplink is used as the uplink sending EIRP value corresponding to each of the at least one reference position, the uplink rate on the at least one reference position is determined according to the uplink sending EIRP value and the preset carrier bandwidth of the uplink, and then the maximum rate supported by the preset carrier bandwidth of the uplink is determined, and system resources such as satellite power and the bandwidth are fully utilized.

In one embodiment, a mean value of the uplink rate on the at least one reference position may be used as the maximum rate supported by the preset carrier bandwidth of the uplink, in one embodiment, a mean value of the uplink rates on all the preset reference positions is used as the maximum rate supported by the preset carrier bandwidth of the uplink, and the maximum rate supported by the preset carrier bandwidth of the uplink may be reasonably determined. An adopted calculation formula is represented as follows:

$$datarate_{UL}=datarate_{total}/M;$$

where $datarate_{UL}$ represents the maximum rate supported by the preset carrier bandwidth of the uplink, $datarate_{total}$ represents a sum of the uplink rates on all the preset reference positions, and $datarate_{total}=\Sigma datarate_m$, m=1 . . . M.

In S304, the ratio of the maximum rate supported by the preset carrier bandwidth of the uplink to the preset maximum supported quantity of the concurrency users may be used as the maximum uplink rate supported by the terminal after the maximum rate supported by the preset carrier bandwidth of the uplink is obtained. An adopted calculation formula is represented as follows:

$$datarate_{max}=datarate_{UL}/N;$$

where $datarate_{max}$ represents the maximum uplink rate supported by the terminal, and N represents the preset maximum supported quantity of the concurrency users.

Thus, the ratio of the maximum rate supported by the preset carrier bandwidth of the uplink to the preset maximum supported quantity of the concurrency users is used as the maximum uplink rate supported by the terminal, then a rate grade of the terminal or the uplink rate to be supported by the terminal is divided according to the maximum uplink rate supported by the terminal, and determining the sending ability of the terminal according to the uplink rate to be supported by the terminal is conductive to allocating system resources to the terminal more reasonably.

In step S305, the uplink rate to be supported by the terminal input by the user is received, whether the uplink rate to be supported by the terminal is greater than the maximum uplink rate supported by the terminal is determined, if yes, the flow is returned to make the user re-input the uplink rate to be supported by the terminal, and if not, the uplink sending maximum EIRP value and/or the uplink sending maximum bandwidth of the terminal is determined according to the uplink rate to be supported by the terminal.

Accordingly, the maximum uplink rate supported by the terminal obtained by calculation may be shown to the user, and the user sets the uplink rate to be supported by the terminal according to the maximum uplink rate supported by the terminal, as long as the set uplink rate to be supported by the terminal is smaller than or equal to the maximum uplink rate supported by the terminal. When the uplink rate $datarate_{actual}$ to be supported by the terminal input by the user is smaller than or equal to $datarate_{max}$, the uplink sending maximum EIRP value and/or the uplink sending maximum bandwidth of the terminal is determined according to the uplink rate to be supported by the terminal. In other words, after the uplink rate to be supported by the terminal input by the user is received and it is determined that the uplink rate to be supported by the terminal input by the user is not greater than the maximum uplink rate supported by the terminal, the sending ability of the terminal can be determined according to the uplink rate to be supported by the terminal, and the system resources are reasonably allocated to the terminal according to the sending ability of the terminal.

Further, the uplink sending maximum EIRP value of the terminal may be determined according to a ratio of the maximum rate supported by the preset carrier bandwidth of the uplink to the uplink rate to be supported by the terminal and $EIRP_{UL}$. In one embodiment, the uplink sending maximum EIRP value of the terminal may be determined through a following formula.

$$EIRP_{actual}=EIRP_{UL}-10*\log 10(datarate_{UL}/datarate_{actual});$$

where $EIRP_{actual}$ represents the uplink sending maximum EIRP value of the terminal.

The uplink sending maximum bandwidth of the terminal may be determined according to a ratio of the uplink rate supported by the terminal to the maximum rate supported by the preset carrier bandwidth of the uplink and the preset carrier bandwidth of the uplink. In one embodiment, the uplink sending maximum bandwidth of the terminal may be determined through a following formula.

$$BW_{actual}=BW_{UL}*(datarate_{actual}/datarate_{UL});$$

where $BW_{actual}$ represents the uplink sending maximum bandwidth of the terminal.

To better facilitate understanding of the method for determining the sending parameters of the terminal provided by the embodiments of the present application, an execution process of the method for determining the sending parameters of the terminal is described in detail below through a specific application example applied to an LEO satellite mobile communication system.

Figure 7:
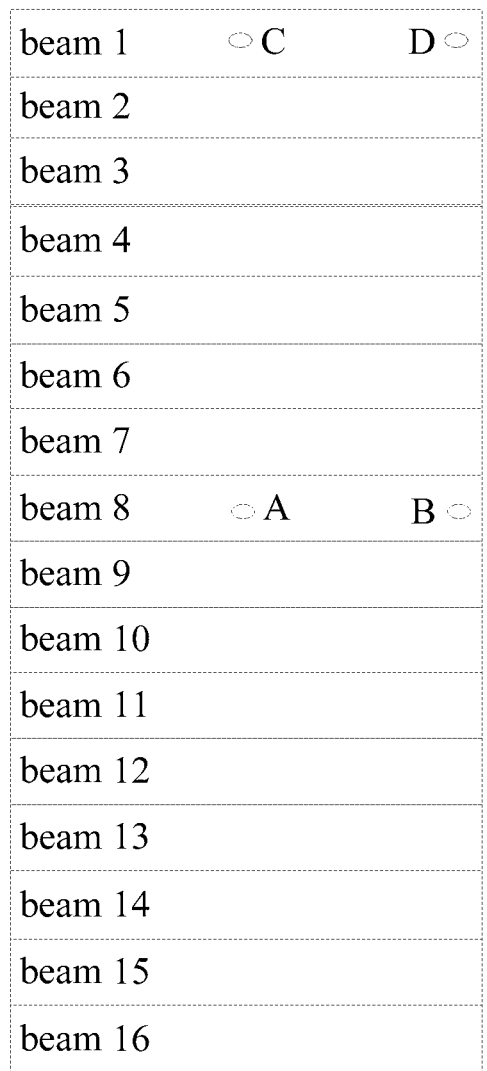
FIG. 7 is a schematic diagram of reference positions in a cell range corresponding to satellite beams provided by an embodiment of the present application.

For the LEO satellite mobile communication system, there are many types of terminals according to differences in antenna form and equivalent antenna aperture. In the specific application example, a terminal type with a phased-array antenna having an equivalent aperture of 1 m is taken as an example for description. A satellite may support beams, and assuming that the satellite forms 16 rectangular beams, a covering range of the satellite may be marked with some typical reference positions, such as a center of a central beam (point A), an edge of a central beam (point B), a center of an edge beam (point C) and an edge of an edge beam (point D), as shown in FIG. 7. The typical reference positions above can most represent a position difference of cells. It needs to be noted that other reference positions may also be selected, and the quantity of the reference positions may be greater than four or less than four. During link pre-calculation, reference positions are considered at the same time, which is conductive to comprehensively analyzing link performance.

A link pre-calculation table of the satellite mobile communication system is established, as shown in Table 1 which is a link pre-calculation example table of the LEO satellite mobile communication system, and the link pre-calculation table may involve entries such as a basic parameter, a sending end parameter, a wireless link parameter, a receiving end parameter and like key information. The basis parameter may include a frequency, a bandwidth, a link distance and so on. The sending end parameter includes EIRP values and so on. The wireless link parameter includes a path loss and other losses. The receiving end parameter includes G/T, noise power, an SNR, a spectral efficiency, a supported rate and so on.

Among various parameters of the link pre-calculation table, the frequency, the bandwidth, the link distance, the EIRP values of a sending end and the G/T of a receiving end are input values, namely known parameters, and these parameters are parameters which are preset or may be obtained via measurement. The path loss, the other losses and the receiving end parameter are values that need to be obtained via calculation. The path loss, the other losses, the noise power of the receiving end, an SNR of a downlink and a spectral efficiency of the downlink belong to intermediate calculated values, and the supported rate of the receiving end is an output value.

TABLE 1

| Category | Parameter name | Attribute |
|---|---|---|
| Basic parameter | Frequency f (GHz) | Input value |
| | Bandwidth BW (MHz) | Input value |
| | Distance d (km) | Input value |
| Sending end parameter | EIRP (dBW) | Input value |
| Wireless link parameter | Path loss $L_0$ (dB) | Calculated value |
| | Other losses $L_1$ (dB) | Calculated value |
| Receiving end parameter | G/T (dB/K) | Input value |
| | Noise power $P_n$ (dB) | Calculated value |
| | SNR (dB) | Calculated value |
| | Spectral efficiency η (bps/Hz) | Calculated value |
| | Supported rate datarate (Mbps) | Output value |

In the case of using multiple carriers, different power amplifiers are used by the satellite for the various carriers, that is, the carriers are different in gain, and the carriers are different in EIRP values. In the embodiments of the present application, link pre-calculation is performed according to a single carrier. It can be understood that each carrier supported by the satellite can be calculated according to the method provided by the embodiments of the present application. Except public information such as the basic parameter and the wireless link parameter, calculation of a downlink relies on EIRP value of satellite and G/T of a terminal receiver, and calculation of an uplink relies on EIRP value of terminal and G/T of a satellite receiver. For a confirmed satellite mobile communication system, the EIRP value of satellite and the G/T of the satellite receiver are fixed, and the G/T of the terminal receiver is also fixed, for example, G/T of a terminal receiver of the phased-array antenna having the equivalent aperture of 1 m is 18 dB/K. However, the EIRP value of terminal is related to a rate needing to be supported and is variant. Therefore, for the downlink, pre-calculation of the downlink can be performed according to a preset carrier bandwidth of the downlink supported by the satellite to obtain performance indexes of the downlink, such as the noise power of the receiving end, the signal-to-noise ratio of the downlink, the spectral efficiency of the downlink, the supported rate and other parameters. As shown in Table 2, it is a downlink pre-calculation example table corresponding to a terminal with a phased-array antenna of a 1 m aperture.

TABLE 2

| Category | Parameter name | Point A | Point B | Point C | Point D |
|---|---|---|---|---|---|
| Basic parameter | Frequency f (GHz) | 20 | 20 | 20 | 20 |
| | Bandwidth $BW_{DL}$ (MHz) | 400 | 400 | 400 | 400 |
| | Distance d (km) | 1200 | 1350 | 1400 | 1550 |

TABLE 2-continued

| Category | Parameter name | Point A | Point B | Point C | Point D |
|---|---|---|---|---|---|
| Sending end parameter | $EIRP_{DL, m}$ (dBW) | 40 | 38 | 40 | 38 |
| Wireless link parameter | Path loss $L_0$ (dB) | 180.00 | 181.03 | 181.34 | 182.23 |
| | Other losses $L_1$ (dB) | 9 | 10 | 11 | 12 |
| Receiving end parameter | $G/T_{DL}$ (dB/K) | 18 | 18 | 18 | 18 |
| | Noise power $P_{Dn}$ (dB) | −142.58 | −142.58 | −142.58 | −142.58 |
| | $SNR_{DL, m}$ (dB) | 11.6 | 7.6 | 8.2 | 4.4 |

During downlink pre-calculation, at the four reference positions of the point A, the point B, the point C and the point D, the frequency corresponding to the single carrier supported by the satellite, the preset carrier bandwidth of the downlink and the link distance are all known parameters, and the sending end parameter (transmit power $EIRP_{DL,m}$ of the satellite) and the receiving end parameter ($G/T_{DL}$ of the terminal receiver) are also known parameters. Based on this, the other losses $L_{1,m}$ corresponding to the four reference positions respectively may be obtained by summation after measurement.

The path loss $L_{0,m}$ corresponding to the four reference positions respectively may be obtained by calculation through a following formula:

$$L_{0,m}=92.4+20 \log(d*f);$$

where d is the link distance (km), and f is the frequency of the carrier (GHz).

The noise power $P_{Dn}$ of the terminal receiver corresponding to each reference position may be obtained by calculation through a following formula:

$$P_{Dn}=-228.6+10*\log(BW_{DL}*10^{\wedge}6);$$

where $BW_{DL}$ is the preset carrier bandwidth of the downlink (MHz).

Knowing the above parameters, the signal-to-noise ratio of the downlink corresponding to the four reference positions respectively may be determined according to a following formula.

$$SNR_{DL,m}=EIRP_{DL,m}+[G/T]_{DL}-P_{Dn}-L_{0,m}-L_{1,m};$$
$$m=A, \ldots D.$$

Table 3 shows a demodulation threshold table, and through the above downlink pre-calculation process, the signal-to-noise ratio of the downlink corresponding to the point A is 11.6 dB, the signal-to-noise ratio of the downlink corresponding to the point B is 7.6 dB, the signal-to-noise ratio of the downlink corresponding to the point C is 8.2 dB, and the signal-to-noise ratio of the downlink corresponding to the point D is 4.4 dB.

TABLE 3

| No. | Spectral efficiency η (bps/Hz) | SNR[dB] |
|---|---|---|
| 1 | 0.0625 | −9.2 |
| 2 | 0.125 | −7.3 |
| 3 | 0.25 | −4.7 |
| 4 | 0.5 | −1.8 |
| 5 | 0.66 | −0.5 |
| 6 | 0.8 | 0.5 |
| 7 | 1 | 1.7 |
| 8 | 1.2 | 2.9 |
| 9 | 1.34 | 3.7 |
| 10 | 1.5 | 4.5 |

TABLE 3-continued

| No. | Spectral efficiency η (bps/Hz) | SNR[dB] |
|---|---|---|
| 11 | 1.6 | 5.1 |
| 12 | 1.66 | 5.6 |
| 13 | 1.75 | 6.3 |
| 14 | 2.01 | 7.8 |
| 15 | 2.1 | 8.2 |
| 16 | 2.4 | 9.5 |
| 17 | 2.67 | 11 |
| 18 | 2.7 | 11.6 |

For the uplink, link pre-calculation can also be performed according to the preset carrier bandwidth of the downlink supported by the satellite, and since the EIRP values of terminal is an uncertain parameter, uplink pre-calculation may be performed and the sending parameters of the terminal may be determined through following two manners.

First manner: a pre-estimated signal-to-noise ratio of the uplink is determined according to the signal-to-noise ratio of the downlink. In one embodiment, it is assumed that the uplink and the downlink have the same signal-to-noise ratio and spectral efficiency. For the four reference positions of the point A, the point B, the point C and the point D, the signal-to-noise ratio $SNR_{DL}=[11.6, 7.6, 8.2, 4.4]$ dB of the downlink corresponding to each reference position has been obtained by calculation in Table 2. In this embodiment, the signal-to-noise ratio of the downlink of each reference position is used as the pre-estimated signal-to-noise ratio $SNR_{UL',m}$ of the uplink on the corresponding reference position. In other embodiments, a sum of the signal-to-noise ratio of the downlink on each reference position and a preset adjustment value may also be used as the pre-estimated signal-to-noise ratio of the uplink on the corresponding reference position.

The noise power $P_{Un}$ of the satellite receiver corresponding to each reference position may be obtained by calculation through a following formula.

$$P_{Un}=-228.6+10*\log(BW_{UL}*10^6);$$

where $BW_{UL}$ is the preset carrier bandwidth of the uplink.

Through a following formula:

$$EIRP_{UL,m}=-[G/T]_{UL}+P_{Un}+SNR_{UL',m}+L_{0,m}+L_{1,m};$$
$$m=A, \ldots D;$$

an EIRP value $EIRP_{UL,m}$ corresponding to the preset carrier bandwidth of the uplink on each reference position may be obtained by calculation, where $[G/T]_{UL}$ is a quality factor of the satellite receiver. By calculation through the above formula, the EIRP values corresponding to the preset carrier bandwidth of the uplink on the four reference positions are $EIRP_{UL,m}=[61.5, 59.5, 61.5, 59.5]$ dBW.

A maximum value in the EIRP values corresponding to the preset carrier bandwidth of the uplink on the four reference positions is taken as uplink sending $EIRP_{UL}$ corresponding to each reference position, namely $EIRP_{UL}=61.5$ dBW. Uplink pre-calculation is performed with the $EIRP_{UL}=61.5$ dBW as an input, to obtain an uplink rate of each of the four reference positions, as shown in Table 4 which is an uplink pre-calculation example table corresponding to the terminal with the 1 m aperture phased-array antenna.

TABLE 4

| Category | Parameter name | Point A | Point B | Point C | Point D |
|---|---|---|---|---|---|
| Basic parameter | Frequency f (GHz) | 30 | 30 | 30 | 30 |
| | Bandwidth $BW_{UL}$ (MHz) | 200 | 200 | 200 | 200 |
| | Distance d (km) | 1200 | 1350 | 1400 | 1550 |
| Sending end parameter | $EIRP_{UL}$ (dBW) | 61.5 | 61.5 | 61.5 | 61.5 |
| Wireless link parameter | Path loss $L_0$ (dB) | 183.53 | 184.55 | 184.86 | 185.75 |
| | Other losses $L_1$ (dB) | 12 | 13 | 14 | 15 |
| Receiving end parameter | $G/T_{UL}$ (dB/K) | 0 | 0 | 0 | 0 |
| | Noise power $Pun_{Un}$ (dB) | −145.59 | −145.59 | −145.59 | −145.59 |
| | $SNR_{UL,m}$ (dB) | 11.6 | 9.5 | 8.2 | 6.3 |
| | Spectral efficiency $\eta_m$ (bps/Hz) | 2.70 | 2.40 | 2.1 | 1.75 |
| | Supported rate datarate$_m$ (Mbps) | 540 | 480 | 420 | 350 |

A process of uplink pre-calculation is as follows, the $IRP_{UL}=61.5$ dBW is used as the uplink sending $EIRP_{UL}$ corresponding to each reference position, and according to a following formula:

$$SNR_{UL,m}=EIRP_{UL}+[G/T]_{UL}-P_{Un}-L_{0,m}-L_{1,m};$$
$$m=A, \ldots D.$$

An actual signal-to-noise ratio $SNR_{UL,m}$ of the uplink corresponding to the four reference positions respectively may be determined. Table 3, namely the demodulation threshold table, discloses a correspondence between the signal-to-noise ratios and the spectral efficiencies, which may be measured in advance and stored, and only a part of the demodulation threshold table is cut out in Table 3. The spectral efficiency $\eta_m$ corresponding to the four reference positions respectively may be determined according to Table 3.

Under the condition that the spectral efficiency $\eta_m$ and the preset carrier bandwidth $BW_{UL}$ of the uplink corresponding to the four reference positions respectively are known, the uplink rate corresponding to the four reference positions respectively may be determined according to a formula datarate$_m=BW_{UL}*\eta_m$, namely the supported rates listed in the last row of Table 4.

On the basis of the uplink rate of each reference position, the maximum uplink rate supported by this type of terminal can be determined under the condition of giving the requirement for the quantity of concurrency users. For example, the maximum uplink rate supported by the terminal is calculated to be (540+480+420+350)/4=448 Mbps by referring to the uplink rate of each reference position obtained in Table 4. A rate grade of the terminal may be set according to the requirement that an uplink rate to be supported by the terminal needs to be smaller than or equal to the maximum uplink rate supported by the terminal. The uplink sending maximum EIRP value and the uplink sending maximum bandwidth of the terminal may be determined according to an uplink rate to be supported by the terminal input by a user, and the uplink rate to be supported by the terminal is not greater than the maximum uplink rate supported by the terminal, as shown in Table 5 which is an example table of the uplink rate to be supported by the terminal and sending parameters.

TABLE 5

| Grade | Maximum supported quantity of concurrency users under single carrier | Maximum uplink rate supported by terminal (Mbps) | Uplink rate to be supported by terminal (Mbps) | Uplink sending maximum EIRP of terminal (dBW) | Uplink sending maximum bandwidth of terminal (MHz) | Potential application scenario of terminal |
|---|---|---|---|---|---|---|
| 1 | 2 | 224 | 200 | 58.5 | 100 | Onboard application such as airliners |
| 2 | 4 | 112 | 100 | 55.5 | 50 | Shipborne application such as luxury liners |
| 3 | 8 | 56 | 50 | 52.5 | 25 | Vehicle application such as trains |

Second manner: the pre-estimated signal-to-noise ratio of the uplink is determined according to a preset minimum signal-to-noise ratio. In the satellite beams, the edge of an edge beam has the lower receiving signal-to-noise ratio relative to other positions, and what is mainly considered is that an uplink signal-to-noise ratio in the edge position of the edge beam needs to meet a minimum signal-to-noise ratio $SNR_{min}$ for system working, and assuming $SNR_{min}=0$ dB, the point D in Table 2 needs to reach the uplink signal-to-noise ratio $SNR_{UL}=0$ dB. Thus, through a formula $EIRP_{UL,m}=[G/T]_{UL}+P_{Un}+SNR_{UL',m}+L_{0,m}+L_{1,m}$; m=A, . . . D, sending $EIRP_{UL}$ of the point D can be calculated to be 55.2 dBW, uplink pre-calculation of all the reference positions is performed by using the $EIRP_{UL}=55.2$ dBW as an input, and the uplink rate of each reference position is obtained, as shown in Table 6 which is an uplink pre-calculation example table corresponding to $SNR_{UL}=0$ dB of the terminal with the 1 m aperture phased-array antenna.

TABLE 6

| Category | Parameter name | Point A | Point B | Point C | Point D |
|---|---|---|---|---|---|
| Basic parameter | Frequency f (GHz) | 30 | 30 | 30 | 30 |
| | Bandwidth $BW_{UL}$ (MHz) | 200 | 200 | 200 | 200 |
| | Distance d (km) | 1200 | 1350 | 1400 | 1550 |
| Sending end parameter | $EIRP_{UL}$ (dBW) | 55.2 | 55.2 | 55.2 | 55.2 |
| Wireless link parameter | Path loss $L_0$ (dB) | 183.53 | 184.55 | 184.86 | 185.75 |
| | Other losses $L_1$ (dB) | 12 | 13 | 14 | 15 |
| Receiving end parameter | $G/T_{UL}$ | 0 | 0 | 0 | 0 |
| | Pn (dB) | −145.59 | −145.59 | −145.59 | −145.59 |
| | $SNR_{UL, m}$ (dB) | 5.3 | 3.2 | 1.9 | 0 |
| | Spectral efficiency (bit/Hz) | 1.60 | 1.25 | 1.00 | 0.72 |
| | Supported rate (Mbps) | 320 | 250 | 200 | 144 |

The specific calculation process is the same as the first manner above and is not repeated here. Finally, the uplink rates corresponding to the four reference positions respectively are determined, such as the supported rates listed in the last row of Table 6.

Similarly, on the basis of the uplink rate of each reference position, the maximum uplink rate supported by this type of terminal can be determined under the condition of giving the requirement for the quantity of concurrency users. For example, the maximum uplink rate supported by the terminal is calculated to be (320+250+200+144)/4=228 Mbps by referring to the uplink rate of each reference position obtained in Table 6. A rate grade of the terminal may be set according to the requirement that an uplink rate to be supported by the terminal needs to be smaller than or equal to the maximum uplink rate supported by the terminal. The uplink sending maximum EIRP value and the uplink sending maximum bandwidth of the terminal may be determined according to an uplink rate to be supported by the terminal input by a user, and the uplink rate to be supported by the terminal is not greater than the maximum uplink rate supported by the terminal.

The embodiments of the present application provide the method for determining the sending parameters of the terminal of the satellite mobile communication system based on link pre-calculation. On the one hand, the reference positions are comprehensively utilized in the method to jointly determine the uplink sending maximum EIRP value and the uplink sending maximum bandwidth of the terminal, and the determined sending parameters of the terminal are more accurate, which is more conductive to meeting system indexes. On the other hand, the method is simple and fast and able to be implemented in a process-oriented mode, and corresponding software or tools are easy to develop.

Based on the same inventive concept as the above method for determining the sending parameters of the terminal, the embodiments of the present application further provide an apparatus for determining sending parameters of a terminal. Since the principle of the apparatus to solve problems is similar to that of the above method for determining the sending parameters of the terminal, the apparatus can be implemented with reference to the above method embodiments, and the repetition is omitted.

Figure 8:
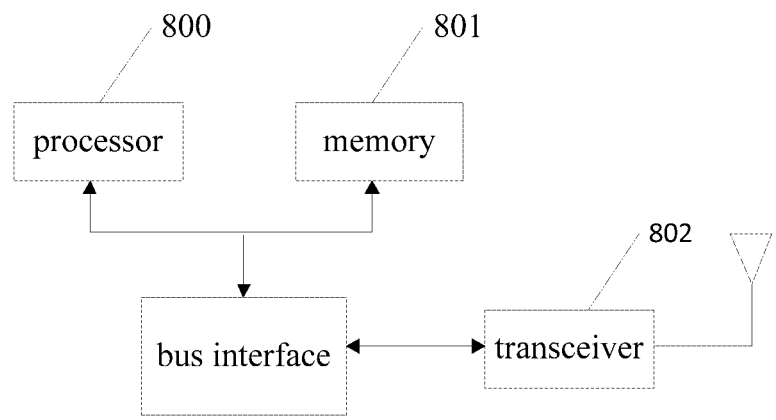
FIG. 8 is a structure block diagram of an apparatus for determining sending parameters of a terminal provided by an embodiment of the present application.

The apparatus for determining the sending parameters of the terminal provided by the embodiments of the present application may be implemented on a satellite or a control device in a satellite mobile communication system, such as a control device of a ground station, a base station or a control center. As shown in FIG. 8, the apparatus for determining the sending parameters of the terminal in the embodiments of the present application includes a processor 800, a memory 801 and a transceiver 802.

The processor 800 is responsible for managing the bus architecture and general processing, and the memory 801 may store data used when the processor 800 executes operations. The transceiver 802 is configured to receive and send data under the control of the processor 800.

The bus architecture may include interconnected buses of any number and bridges of any number, which are linked together through various circuits of one or more processors represented by the processor 800 and various circuits of memories represented by the memory 801. The bus architecture may also link various other circuits such as peripheral devices, voltage regulators, and power management circuits, which are well known in the art, and therefore are not further described herein. A bus interface provides an interface. The processor 800 is responsible for managing the bus architecture and general processing, and the memory 801 may store data used when the processor 800 executes operations.

A process disclosed in the embodiments of the present application may be applied to the processor 800 or implemented by the processor 800. During an implementation process, all steps of a signal processing flow may be completed by an integrated logic circuit of hardware or an instruction in the form of software in the processor 800. The processor 800 may be a general-purpose processor, a digital signal processor, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor may be a microprocessor, or any processor, etc. The steps of the method disclosed in conjunction with the embodiment of the present application may be directly embodied to be executed and completed by a hardware processor, or may be executed and completed through a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 801, and the processor 800 reads information in the memory 801, and completes the steps of the signal processing flow in combination with its hardware.

Accordingly, the processor 800 is configured to read a program in the memory 801 and execute:

determining a pre-estimated signal-to-noise ratio of an uplink on at least one reference position in a cell range corresponding to a satellite beam;

determining EIRP values corresponding to a preset carrier bandwidth of the uplink on the at least one reference position according to the pre-estimated signal-to-noise ratio of the uplink on the at least one reference position;

determining a maximum rate supported by the preset carrier bandwidth of the uplink according to the EIRP value corresponding to the preset carrier bandwidth of the uplink on the at least one reference position;

determining a maximum uplink rate supported by the terminal according to the maximum rate supported by the preset carrier bandwidth of the uplink and a preset maximum supported quantity of concurrency users; and determining an uplink sending maximum EIRP value and/or an uplink sending maximum bandwidth of the terminal according to an uplink rate to be supported by the terminal input by a user; the uplink rate to be supported by the terminal is not greater than the maximum uplink rate supported by the terminal.

In one embodiment, the processor 800 is configured to execute:

determining a signal-to-noise ratio of a downlink on the at least one reference position according to transmit power of a satellite corresponding to the at least one reference position and a preset quality factor of a terminal receiver, and using the signal-to-noise ratio of the downlink on the at least one reference position as the pre-estimated signal-to-noise ratio of the uplink on the at least one reference position or using a sum of the signal-to-noise ratio of the downlink and a preset adjustment value as the pre-estimated signal-to-noise ratio of the uplink; or using a preset minimum signal-to-noise ratio as the pre-estimated signal-to-noise ratio of the uplink on the at least one reference position.

In one embodiment, the processor 800 is configured to execute:

determining the EIRP values corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

In one embodiment, the processor 800 is configured to execute:

using a maximum value in the EIRP values corresponding to the preset carrier bandwidth of the uplink as an uplink sending EIRP value corresponding to each of the at least one reference position;

determining an uplink rate on the at least one reference position according to the uplink sending EIRP value and the preset carrier bandwidth of the uplink; and determining the maximum rate supported by the preset carrier bandwidth of the uplink according to the uplink rate on the at least one reference position.

In one embodiment, the processor 800 is configured to execute:

determining an actual signal-to-noise ratio of the uplink on the at least one reference position according to the uplink sending EIRP value, a link loss, a preset quality factor of a satellite receiver and noise power of the satellite receiver;

determining spectral efficiency on the at least one reference position according to the actual signal-to-noise ratio of the uplink on the at least one reference position; and determining the uplink rate on the at least one reference position according to the spectral efficiency on the at least one reference position and the preset carrier bandwidth of the uplink.

In one embodiment, the processor 800 is configured to execute:

using a mean value of the uplink rate on the at least one reference position as the maximum rate supported by the preset carrier bandwidth of the uplink.

In one embodiment, the processor 800 is configured to execute:

using a ratio of the maximum rate supported by the preset carrier bandwidth of the uplink to the preset maximum supported quantity of the concurrency users as the maximum uplink rate supported by the terminal.

In one embodiment, the processor 800 is configured to execute:

receiving the uplink rate to be supported by the terminal input by the user;

determining whether the uplink rate to be supported by the terminal is greater than the maximum uplink rate supported by the terminal; and determining the uplink sending maximum EIRP value and/or the uplink sending maximum bandwidth of the terminal according to the uplink rate to be supported by the terminal, if the uplink rate to be supported by the terminal is not greater than the maximum uplink rate supported by the terminal.

According to the apparatus for determining the sending parameters of the terminal provided by the embodiments of the present application, the pre-estimated signal-to-noise ratio of the uplink on the at least one reference position in the cell range corresponding to the satellite beam is determined first, the EIRPs value corresponding to the preset carrier bandwidth of the uplink on the at least one reference position is determined according to the pre-estimated signal-to-noise ratio of the uplink on the at least one reference position, the maximum rate supported by the preset carrier bandwidth of the uplink is determined according to the EIRP values corresponding to the preset carrier bandwidth of the uplink on the at least one reference position, the maximum uplink rate supported by the terminal is determined according to the maximum rate supported by the preset carrier bandwidth of the uplink, an uplink rate to be supported by the terminal not greater than the maximum uplink rate supported by the terminal is determined, and uplink sending parameters of the terminal are determined according to the uplink rate to be supported by the terminal. The apparatus can quickly and reasonably determine the uplink sending parameters of the terminal, and a control device in a satellite mobile communication system allocates relevant resources to the terminal according to the obtained uplink sending parameters of the terminal, to guarantee reasonable use of system resources.

Based on the same inventive concept as the above method for determining the sending parameters of the terminal, the embodiments of the present application further provide an apparatus for determining sending parameters of a terminal. Since the principle of the apparatus to solve problems is similar to that of the above method for determining the sending parameters of the terminal, the apparatus can be implemented with reference to the above method embodiment, and the repetition is omitted.

Figure 9:
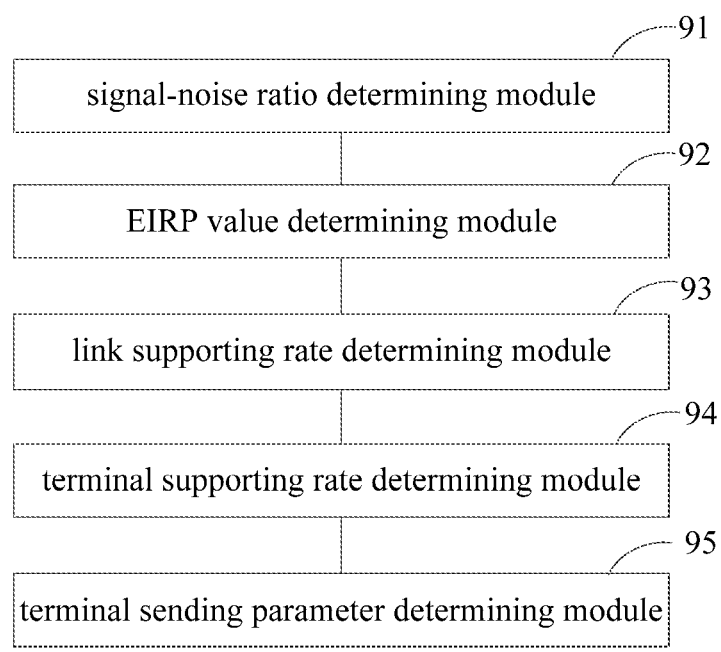
FIG. 9 is a structure block diagram of another apparatus for determining sending parameters of a terminal provided by an embodiment of the present application.

As shown FIG. 9, the apparatus for determining the sending parameters of the terminal provided by the embodiments of the present application includes following devices:

a signal-to-noise ratio determining device 91, configured to determine a pre-estimated signal-to-noise ratio of an uplink on at least one reference position in a cell range corresponding to a satellite beam;

an EIRP value determining device 92, configured to determine EIRP values corresponding to a preset carrier bandwidth of the uplink on the at least one reference position according to the pre-estimated signal-to-noise ratio of the uplink on the at least one reference position;

a link supporting rate determining device 93, configured to determine a maximum rate supported by the preset carrier bandwidth of the uplink according to the EIRP values corresponding to the preset carrier bandwidth of the uplink on the at least one reference position;

a terminal supporting rate determining device 94, configured to determine a maximum uplink rate supported by the terminal according to the maximum rate supported by the preset carrier bandwidth of the uplink and a preset maximum supported quantity of concurrency users; and a terminal sending parameter determining device 95, configured to determine an uplink sending maximum EIRP value and/or an uplink sending maximum bandwidth of the terminal according to an uplink rate to be supported by the terminal input by a user, the uplink rate to be supported by the terminal is not greater than the maximum uplink rate supported by the terminal.

In one embodiment, the signal-to-noise ratio determining device 91 may be further configured to:

determine a signal-to-noise ratio of a downlink on the at least one reference position according to transmit power of a satellite corresponding to the at least one reference position and a preset quality factor of a terminal receiver, and use the signal-to-noise ratio of the downlink on the at least one reference position as the pre-estimated signal-to-noise ratio of the uplink on the at least one reference position or use a sum of the signal-to-noise ratio of the downlink and a preset adjustment value as the pre-estimated signal-to-noise ratio of the uplink; or use a preset minimum signal-to-noise ratio as the pre-estimated signal-to-noise ratio of the uplink on the at least one reference position.

In one embodiment, the EIRP value determining device 92 may be further configured to:

determine the EIRP values corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

In one embodiment, the link supporting rate determining device 93 may be further configured to:

use a maximum value in the obtained EIRP values corresponding to the preset carrier bandwidth of the uplink as an uplink sending EIRP value corresponding to each of the at least reference position;

determine an uplink rate on the at least one reference position according to the uplink sending EIRP value and the preset carrier bandwidth of the uplink; and determine the maximum rate supported by the preset carrier bandwidth of the uplink according to the uplink rate on the at least one reference position.

In one embodiment, the link supporting rate determining device 93 may be further configured to:

determine an actual signal-to-noise ratio of the uplink on the at least one reference position according to the uplink sending EIRP value, a link loss, a preset quality factor of a satellite receiver and noise power of the satellite receiver;

determine spectral efficiency on the at least one reference position according to the actual signal-to-noise ratio of the uplink on the at least one reference position; and determine the uplink rate on the at least one reference position according to the spectral efficiency on the at least one reference position and the preset carrier bandwidth of the uplink.

In one embodiment, the link supporting rate determining device 93 may be further configured to:

use a mean value of the uplink rate on the at least one reference position as the maximum rate supported by the preset carrier bandwidth of the uplink.

In one embodiment, the terminal supporting rate determining device 94 may be further configured to:

use a ratio of the maximum rate supported by the preset carrier bandwidth of the uplink to the preset maximum supported quantity of the concurrency users as the maximum uplink rate supported by the terminal.

In one embodiment, the terminal sending parameter determining device 95 may be further configured to:

receive the uplink rate to be supported by the terminal input by the user;

determine whether the uplink rate to be supported by the terminal is greater than the maximum uplink rate supported by the terminal; and determine the uplink sending maximum EIRP value and/or the uplink sending maximum bandwidth of the terminal according to the uplink rate to be supported by the terminal, if the uplink rate to be supported by the terminal is not greater than the maximum uplink rate supported by the terminal.

According to the apparatus for determining the sending parameters of the terminal provided by the embodiments of the present application, the pre-estimated signal-to-noise ratio of the uplink on the at least one reference position in the cell range corresponding to the satellite beam is determined first, the EIRP values corresponding to the preset carrier bandwidth of the uplink on the at least one reference position is determined according to the pre-estimated signal-to-noise ratio of the uplink on the at least one reference position, the maximum rate supported by the preset carrier bandwidth of the uplink is determined according to the EIRP values corresponding to the preset carrier bandwidth of the uplink on the at least one reference position, the maximum uplink rate supported by the terminal is determined according to the maximum rate supported by the preset carrier bandwidth of the uplink, an uplink rate to be supported by the terminal not greater than the maximum uplink rate supported by the terminal is determined, and uplink sending parameters of the terminal are determined according to the uplink rate to be supported by the terminal. The apparatus can quickly and reasonably determine the uplink sending parameters of the terminal, and a control device in a satellite mobile communication system allocates relevant resources to the terminal according to the obtained uplink sending parameters of the terminal, to guarantee reasonable use of system resources.

The embodiments of the present application provide a computer medium, the computer-readable storage medium stores computer instructions, and the computer instructions, when executed by a processor, implement the method for determining the sending parameters of the terminal provided by any of the above embodiments.

The embodiments of the present application further provide a computing device readable storage medium for the method for determining the sending parameters of the terminal, that is, the content stored in the storage medium will not be lost after power failure. The storage medium stores a software program, including a program code. When the program code runs on a computing device, the software program can implement the solution of the method for determining the sending parameters of the terminal in any of the embodiments of the present application when it is read and executed by one or more processors.

The embodiments of the present application are described above with reference to block diagrams and/or flow diagrams showing methods, apparatuses (systems) and/or computer program products according to the embodiments of the present application. It should be understood that a block of the block diagrams and/or flow diagrams and a combination of blocks of the block diagrams and/or the flow diagrams can be implemented by computer program instructions. These computer program instructions may be provided for a processor of a general-purpose computer and a special-purpose computer and/or other programmable data processing apparatuses to produce a machine, and instructions executed by the processor of the computer and/or other programmable data processing apparatuses create a method for implementing a function/action specified in blocks of the block diagrams and/or flow diagrams.

The embodiments of the present application may be provided as methods, systems, or computer program products. Therefore, the present application may take the form of a full hardware embodiment, a full software embodiment, or an embodiment combining software and hardware. Besides, the present application may adopt the form of a computer program product implemented on one or more computer available storage media (including but not limited to a disk memory, a CD-ROM, an optical memory and the like) containing computer available program codes.

The present application is described with reference to the flow diagrams and/or block diagrams of the method, apparatus (system), and computer program product according to the present application. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, and instructions executed by processors of a computer or other programmable data processing devices generate an apparatus for implementing the functions specified in one or more flows of the flow diagram and/or one or more blocks of the block diagram.

These computer program instructions can also be stored in a computer-readable memory to guide a computer or other programmable data processing devices to work in a specific manner, and instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, and a series of operation steps are executed on the computer or other programmable devices to produce computer-implemented processing, and thus, the instructions executed on the computer or other programmable devices provide steps for implementing the functions specified in one or more flows of the flow diagram and/or one or more blocks of the block diagram.

What is claimed is:

1. A method for determining sending parameters of a terminal, comprising:
   determining a pre-estimated signal-to-noise ratio of an uplink on at least one reference position in a cell range corresponding to a satellite beam;
   determining effective isotropic radiated power (EIRP) values corresponding to a preset carrier bandwidth of the uplink on the at least one reference position according to the pre-estimated signal-to-noise ratio of the uplink on the at least one reference position;
   determining a maximum rate supported by the preset carrier bandwidth of the uplink according to the EIRP values corresponding to the preset carrier bandwidth of the uplink on the at least one reference position;
   determining a maximum uplink rate supported by the terminal according to the maximum rate supported by the preset carrier bandwidth of the uplink and a preset maximum supported quantity of concurrency users; and
   determining at least one of an uplink sending maximum EIRP value or an uplink sending maximum bandwidth of the terminal according to an uplink rate to be supported by terminal input by a user, wherein the uplink rate to be supported by the terminal is not greater than the maximum uplink rate supported by the terminal.

2. The method according to claim 1, wherein the determining the pre-estimated signal-to-noise ratio of the uplink on the at least one reference position in the cell range corresponding to the satellite beam, comprises:
   determining a signal-to-noise ratio of a downlink on the at least one reference position according to transmit power of a satellite corresponding to the at least one reference position and a preset quality factor of a terminal receiver, and using the signal-to-noise ratio of the downlink on the at least one reference position as the pre-estimated signal-to-noise ratio of the uplink on the at least one reference position or using a sum of the signal-to-noise ratio of the downlink and a preset adjustment value as the pre-estimated signal-to-noise ratio of the uplink; or using a preset minimum signal-to-noise ratio as the pre-estimated signal-to-noise ratio of the uplink on the at least one reference position.

3. The method according to claim 1, wherein the determining the EIRP values corresponding to the preset carrier bandwidth of the uplink on the at least one reference position according to the pre-estimated signal-to-noise ratio of the uplink on the at least one reference position, comprises:

determining the EIRP values corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

4. The method according to claim 1, wherein the determining the maximum rate supported by the preset carrier bandwidth of the uplink according to the EIRP values corresponding to the preset carrier bandwidth of the uplink on the at least one reference position, comprises:

using a maximum value in the EIRP values corresponding to the preset carrier bandwidth of the uplink as an uplink sending EIRP value corresponding to each of the at least one reference position;

determining an uplink rate on the at least one reference position according to the uplink sending EIRP value and the preset carrier bandwidth of the uplink; and determining the maximum rate supported by the preset carrier bandwidth of the uplink according to the uplink rate on the at least one reference position.

5. The method according to claim 4, wherein the determining the uplink rate on the at least one reference position according to the uplink sending EIRP value and the preset carrier bandwidth of the uplink, comprises:

determining an actual signal-to-noise ratio of the uplink on the at least one reference position according to the uplink sending EIRP value, a link loss, a preset quality factor of a satellite receiver and noise power of the satellite receiver;

determining spectral efficiency on the at least one reference position according to the actual signal-to-noise ratio of the uplink on the at least one reference position; and determining the uplink rate on the at least one reference position according to the spectral efficiency on the at least one reference position and the preset carrier bandwidth of the uplink.

6. The method according to claim 4, wherein the determining the maximum rate supported by the preset carrier bandwidth of the uplink according to the uplink rate on the at least one reference position, comprises:

using a mean value of the uplink rate on the at least one reference position as the maximum rate supported by the preset carrier bandwidth of the uplink.

7. The method according to claim 1, wherein the determining the maximum uplink rate supported by the terminal according to the maximum rate supported by the preset carrier bandwidth of the uplink and the preset maximum supported quantity of the concurrency users, comprises:

using a ratio of the maximum rate supported by the preset carrier bandwidth of the uplink to the preset maximum supported quantity of the concurrency users as the maximum uplink rate supported by the terminal.

8. The method according to claim 1, wherein the determining at least one of the uplink sending maximum EIRP value or the uplink sending maximum bandwidth of the terminal according to the uplink rate to be supported by the terminal input by the user, comprises:

receiving the uplink rate to be supported by the terminal input by the user;

determining whether the uplink rate to be supported by the terminal is greater than the maximum uplink rate supported by the terminal; and determining at least one of the uplink sending maximum EIRP value or the uplink sending maximum bandwidth of the terminal according to the uplink rate to be supported by the terminal, if the uplink rate to be supported by the terminal is not greater than the maximum uplink rate supported by the terminal.

9. A non-transitory computer-readable storage medium, wherein the non-transitory computer-readable storage medium stores computer instructions, and the computer instructions, when executed by a processor, implement the method for determining the sending parameters of the terminal according to claim 1.

10. An apparatus for determining sending parameters of a terminal, comprising: a processor and a memory, wherein the processor is configured to read a computer instruction in the memory and execute:

determining a pre-estimated signal-to-noise ratio of an uplink on at least one reference position in a cell range corresponding to a satellite beam;

determining effective isotropic radiated power (EIRP) values corresponding to a preset carrier bandwidth of the uplink on the at least one reference position according to the pre-estimated signal-to-noise ratio of the uplink on the at least one reference position;

determining a maximum rate supported by the preset carrier bandwidth of the uplink according to the EIRP values corresponding to the preset carrier bandwidth of the uplink on the at least one reference position;

determining a maximum uplink rate supported by the terminal according to the maximum rate supported by the preset carrier bandwidth of the uplink and a preset maximum supported quantity of concurrency users; and determining at least one of an uplink sending maximum EIRP value or an uplink sending maximum bandwidth of the terminal according to an uplink rate to be supported by the terminal input by a user, wherein the uplink rate to be supported by terminal is not greater than the maximum uplink rate supported by the terminal.

11. The apparatus according to claim 10, wherein the processor is configured to execute:

determining a signal-to-noise ratio of a downlink on the at least one reference position according to transmit power of a satellite corresponding to the at least one reference position and a preset quality factor of a terminal receiver, and using the signal-to-noise ratio of the downlink on the at least one reference position as the pre-estimated signal-to-noise ratio of the uplink on the at least one reference position or using a sum of the signal-to-noise ratio of the downlink and a preset adjustment value as the pre-estimated signal-to-noise ratio of the uplink; or using a preset minimum signal-to-noise ratio as the pre-estimated signal-to-noise ratio of the uplink on the at least one reference position.

12. The apparatus according to claim 10, wherein the processor is configured to execute:

determining the EIRP values corresponding to the preset carrier bandwidth of the uplink on the at least one reference position according to a link loss, a preset quality factor of a satellite receiver, noise power of the satellite receiver and the pre-estimated signal-to-noise ratio of the uplink on the at least one reference position.

13. The apparatus according to claim 10, wherein the processor is configured to execute:

using a maximum value in the obtained EIRP values corresponding to the preset carrier bandwidth of the uplink as an uplink sending EIRP value corresponding to each of the at least one reference position;

determining an uplink rate on the at least one reference position according to the uplink sending EIRP value and the preset carrier bandwidth of the uplink; and determining the maximum rate supported by the preset carrier bandwidth of the uplink according to the uplink rate on the at least one reference position.

14. The apparatus according to claim 13, wherein the processor is configured to execute:

determining an actual signal-to-noise ratio of the uplink on the at least one reference position according to the uplink sending EIRP value, a link loss, a preset quality factor of a satellite receiver and noise power of the satellite receiver;

determining spectral efficiency on the at least one reference position according to the actual signal-to-noise ratio of the uplink on the at least one reference position; and determining the uplink rate on the at least one reference position according to the spectral efficiency on the at least one reference position and the preset carrier bandwidth of the uplink.

15. The apparatus according to claim 13, wherein the processor is configured to execute:

using a mean value of the uplink rate on the at least one reference position as the maximum rate supported by the preset carrier bandwidth of the uplink.

16. The apparatus according to claim 10, wherein the processor is configured to execute:

using a ratio of the maximum rate supported by the preset carrier bandwidth of the uplink to the preset maximum supported quantity of the concurrency users as the maximum uplink rate supported by the terminal.

17. The apparatus according to claim 10, wherein the processor is configured to execute:

receiving the uplink rate to be supported by the terminal input by the user;

determining whether the uplink rate to be supported by the terminal is greater than the maximum uplink rate supported by the terminal; and determining at least one of the uplink sending maximum EIRP value or the uplink sending maximum bandwidth of the terminal according to the uplink rate to be supported by the terminal, if the uplink rate to be supported by the terminal is not greater than the maximum uplink rate supported by the terminal.

* * * * *